United States Patent

Hartness et al.

[11] 4,029,195
[45] June 14, 1977

[54] GUIDE APPARATUS FOR AN ARTICLE CONVEYING MACHINE

[76] Inventors: Thomas P. Hartness, 305 Bridgewater Drive; Robert G. Hartness, 203 Wilmington Road, both of Greenville, S.C. 29607

[22] Filed: Sept. 24, 1975

[21] Appl. No.: 616,427

[52] U.S. Cl. ............................. 198/399; 198/445
[51] Int. Cl.² ...................................... B65G 47/24
[58] Field of Search ............... 198/29, 30, 282, 288, 198/276, 268–272, 204, 445, 446, 399, 390, 416; 53/159, 247

[56] References Cited

UNITED STATES PATENTS

| | | | |
|---|---|---|---|
| 2,530,419 | 11/1950 | Bourland | 198/30 |
| 3,643,782 | 2/1972 | Risley | 198/30 |
| 3,647,051 | 3/1972 | Didas | 198/204 |
| 3,710,918 | 1/1973 | Babunovic | 198/30 |
| 3,722,659 | 3/1973 | Aidlin et al. | 198/271 |

Primary Examiner—Evon C. Blunk
Assistant Examiner—Joseph E. Valenza
Attorney, Agent, or Firm—Bailey, Dority & Flint

[57] ABSTRACT

This invention relates to guide apparatus for use in article conveying machines such as bottle handling machines wherein bottles are conveyed on a conveyor in a co-mingled mass to guide apparatus for aligning the bottles in parallel rows to be conveyed in rows. The guide apparatus comprises a pair of outside guide rails and at least one intermediate guide rail having an inclined leading edge for positioning tilted bottles to an upright position while being moved by the conveyor, and a wedging device carried by the intermediate guide rail for separating the bottles into parallel aligned rows between the guide rails.

8 Claims, 4 Drawing Figures

GUIDE APPARATUS FOR AN ARTICLE CONVEYING MACHINE

BACKGROUND OF THE INVENTION

When conveying articles in a co-mingled mass on a conveyor, such as a conveyor belt, it is often necessary to separate the articles into aligned parallel rows for conveying the articles in rows to a further processing station. More particularly, in bottle handling machines, separating the co-mingled mass of bottles on the conveyor belt into parallel aligned rows is necessary before the bottles are conveyed to a subsequent processing station such as a grid set used to load bottles into empty cases below the grid set, for example, as shown in applicant's prior U.S. Pat. No. 3,788,034.

Prior bottle handling machines such as the case packing machines shown in U.S. Pat. Nos. 3,481,108 and 3,555,770, have utilized a plurality of parallel guide rail members for separating the co-mingled mass of bottles into aligned parallel rows. Quite often, however, the bottles become tilted on the conveyor and fall over in front of the guide rails causing the bottles to jam up in front of the guide rails necessitating the stopping of the conveyor and positioning the bottles upright by the machine attendant. On some machines the bottles become locked between two bottles and the end of a guide rail. Other problems concerning separating the bottles into parallel rows at the same speed at which the bottles are conveyed have been encountered with this type of device.

SUMMARY OF THE INVENTION

A guide apparatus is provided for use in bottle handling machines and the like wherein bottles are conveyed on a conveyor in a co-mingled mass to a guide means for aligning the bottles in parallel rows to be conveyed in rows. The guide apparatus comprises a pair of outside guide rails carried above the conveyor on which the bottles travel, and at least one intermediate guide rail carried above a longitudinal portion of the conveyor having a leading edge inclined inwardly from the top to the bottom of the intermediate guide rail for engaging a body portion of the bottle when in a tilted position. A wedging device is carried by the intermediate guide rail for separating the bottles into parallel aligned rows between the guide rails. The inclined leading edge engages any tilted bottles to position them in an upright position as they are moved by the conveyor.

Accordingly, an important object of the present invention is to provide guide apparatus for use in bottle handling machines and the like for separating the bottles moving as a co-mingled mass on a conveyor into parallel aligned rows to be conveyed in rows.

Another important object of the present invention is to provide guide apparatus for use in bottle handling machines and the like for separating bottles being conveyed in a co-mingled mass into parallel aligned rows so as to alleviate the possibility of the bottles jamming at the entrance to the guide apparatus.

Another important object of the present invention is to provide a wedging device for engaging the upper neck portion of a bottle for separating the upright bottles into parallel aligned rows.

Another important object of the present invention is to provide a wedging device for use with bottle handling machines for separating bottles traveling on a conveyor into aligned parallel rows which includes an inclined leg depending from the wedging device for engaging a body portion of a tilted bottle to position the bottle in an upright position while being conveyed.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

DESCRIPTION OF A PREFERRED EMBODIMENT

Figure 1:
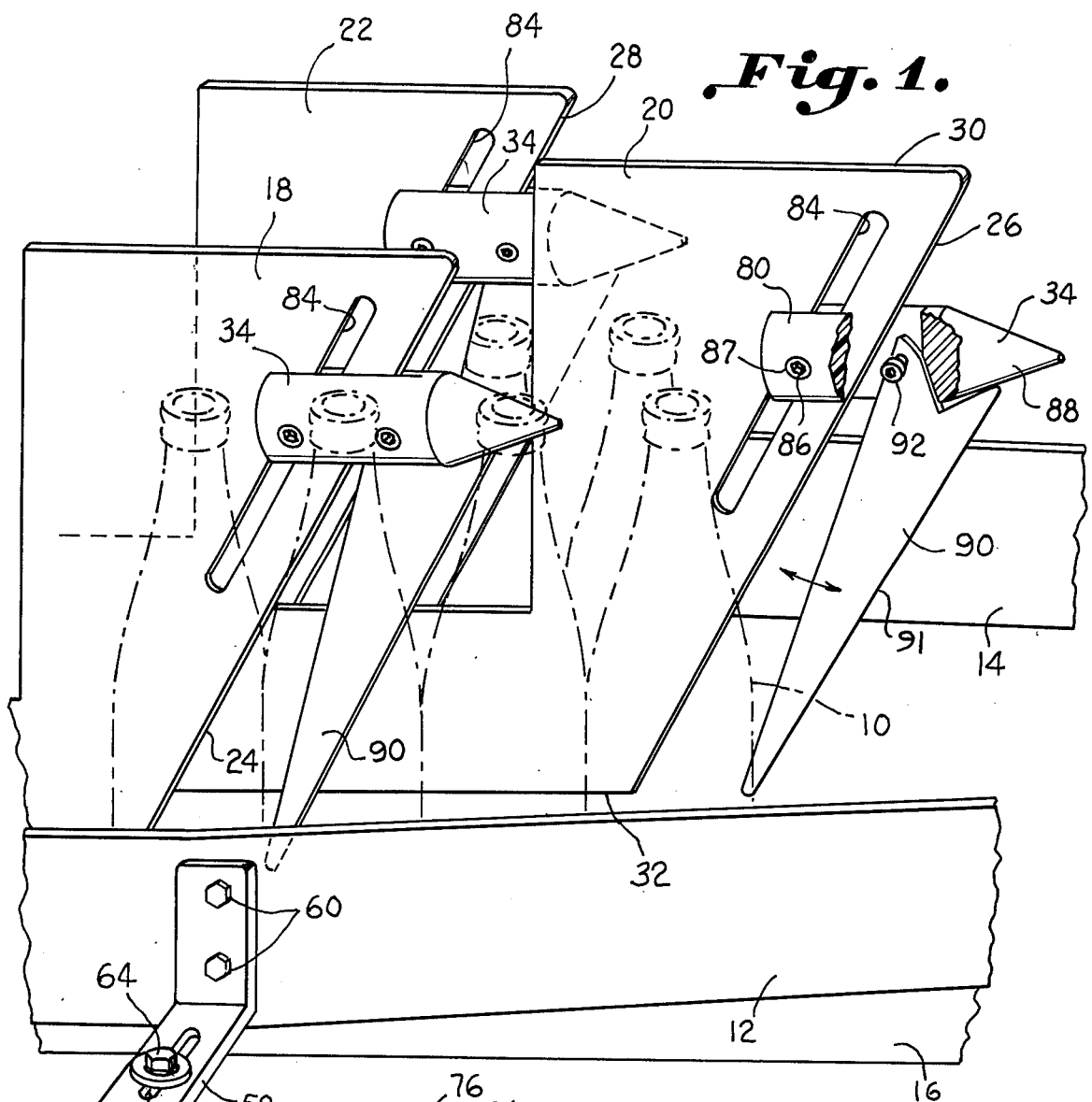
FIG. 1 is a perspective view illustrating a guide apparatus constructed in accordance with the present invention as used on the bottle handling machine.

The guide apparatus of the present invention may be incorporated in any conventional article handling machine where it is desired to separate articles conveyed in a co-mingled mass into aligned parallel rows to be conveyed in rows to a subsequent processing station. In a preferred embodiment, the application of the present invention is illustrated in connection with a bottle handling machine wherein bottles are conveyed in a co-mingled mass to the guide apparatus of the present invention for separation into aligned parallel rows. Thereafter, the bottles may be conveyed in the parallel rows to the desired subsequent processing station which may be, as for example, a grid set such as shown in applicant's prior U.S. Pat. No. 3,788,034 for loading the bottles into empty cases positioned below the grid set.

The drawings show only so much of a conventional bottle handling machine, such as disclosed in the applicant's above mentioned prior patent, as is necessary to illustrate the application thereto of the present invention.

Referring now to the drawings, there is illustrated a guide apparatus for use in bottle handling machines and the like wherein the bottles 10 are conveyed in a co-mingled mass to the guide apparatus for aligning the bottles in parallel rows to be conveyed in rows to a subsequent processing station. The guide apparatus comprises a pair of outside guide rails 12 and 14 carried above the conveyor 16 on which the bottles travel, and a plurality of intermediate guide rails 18, 20, and 22 carried above a longitudinal section of the conveyor and spaced between the outside guide rails 12 and 14. The conveyor 16 may be any conventional conveyor system such as an endless traveling belt arrangement. Each of the intermediate guide rails has an inclined leading edge 24, 26 and 28, respectively. Since the leading edges of the intermediate guide rails are identical, intermediate guide rail 20 will be referred to in describing the inclined leading edge. The leading edge 26 of intermediate guide rail member 20 makes an acute angle with the top edge 30 of the guide rail of approximately 60 degrees and is inclined inwardly therefrom down to the bottom edge 32. A wedging device 34 is carried by each of the intermediate guide rails for separating the bottles into parallel aligned rows between the guide rails.

The intermediate guide rails 18, 20, and 22, as well as the outside guide rails 12 and 14, are carried on horizontal threaded rod members 40 and 42 and depend downwardly therefrom terminating closely adjacent the top surface of the conveyor 16. The threaded rod members 40 and 42 are supported by the vertical standards 44 and 46 which are integrally attached to the side frame of the bottle handling machine. The guide rail members are closely adjacent the conveyor, but do not contact the conveyor surface so that the conveyor may travel freely therebeneath. The threaded rod 42 is attached to the standard 46 by nut members 48 and is secured to the opposite standard 44 by nut members 50. A plurality of spacer plates 52 are carried on the threaded rods 40 and 42 providing the desired spacing between the outside and intermediate guide rails. The spacing plates 52 may have a substantially U-shaped cross-section with a shorter leg thereof being hooked over the upper threaded rod 40. With the spacer plates 52 in place on the threaded rod members the nut members 54 on the threaded rod 40 and the nut members 56 on the threaded rod 42 may be tightened against the outside guide rails 12 and 14 so as to tighten the spacer plate and guide rail together providing a rigid assembly thereof. The outside guide rail 12 is further secured by an L-shaped bracket 58 which is attached to the outside guide rail 12 by bolt members 60 in the side thereof and then may be attached to a portion of the side frame 62 of the bottle handling machine by bolt member 64. The L-shaped bracket 58 has a slot 66 formed therein providing adjustable lateral movement and spacing of the outside guide rail 12. An identical L-shaped bracket 68 is attached to the side of outside guide rail 14 by use of bolt members 70 and is attached to a portion 72 of the side frame of the bottle handling machine by use of bolt member 74. The L-shaped bracket 68 is also provided with a longitudinal slot 76 so that the outside guide rail 14 may be adjusted and positioned laterally. The L-shaped brackets 58 and 68 are necessary in order to provide the outside guide rails 12 and 14 with sufficient rigidity at the bottom thereof so as to contain the mass of bottles 10 when being forced into parallel rows.

The wedging device 34 comprises an elongated body portion 80 which in a preferred embodiment is cylindrical in cross-section having a diametrical slot 82 formed through the diameter of the cylindrical body portion for being slideably received over the edge of an intermediate guide rail.

Figure 3:
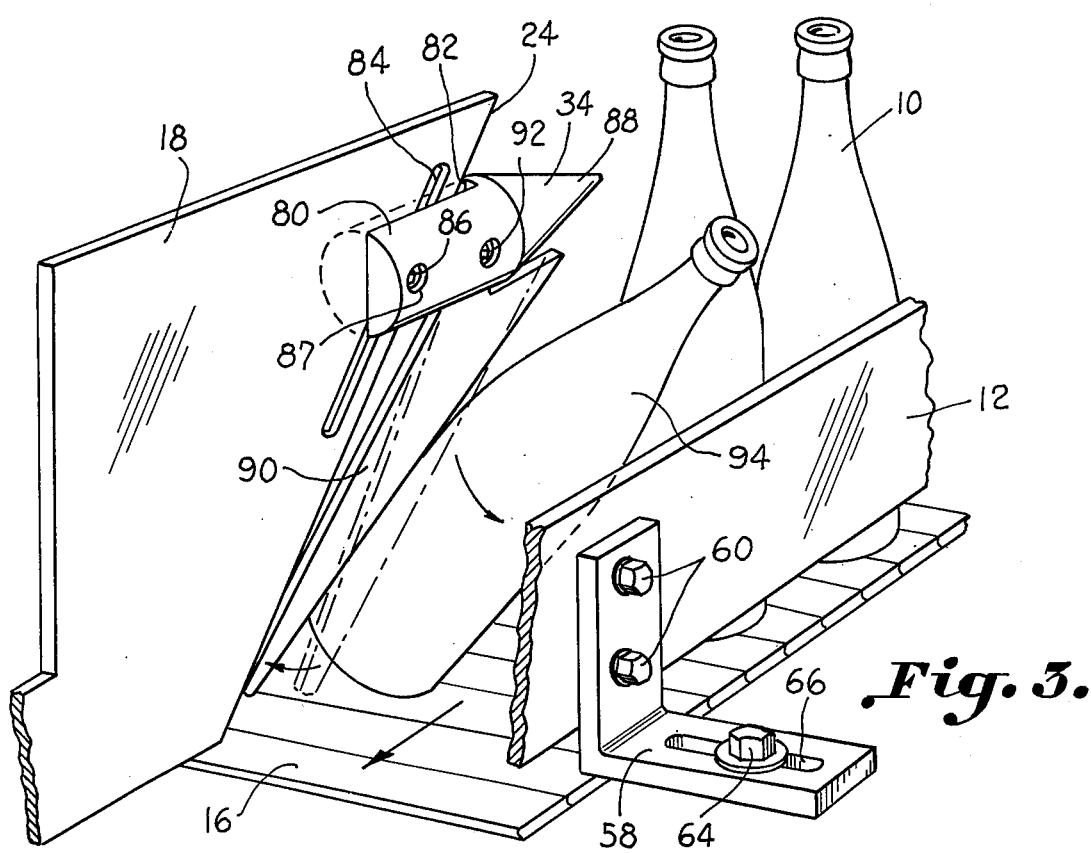
FIG. 3 is a perspective view of the guide apparatus of FIG. 1 with parts omitted illustrating the positioning by the guide apparatus of a tilted bottle to an upright position.
Figure 4:
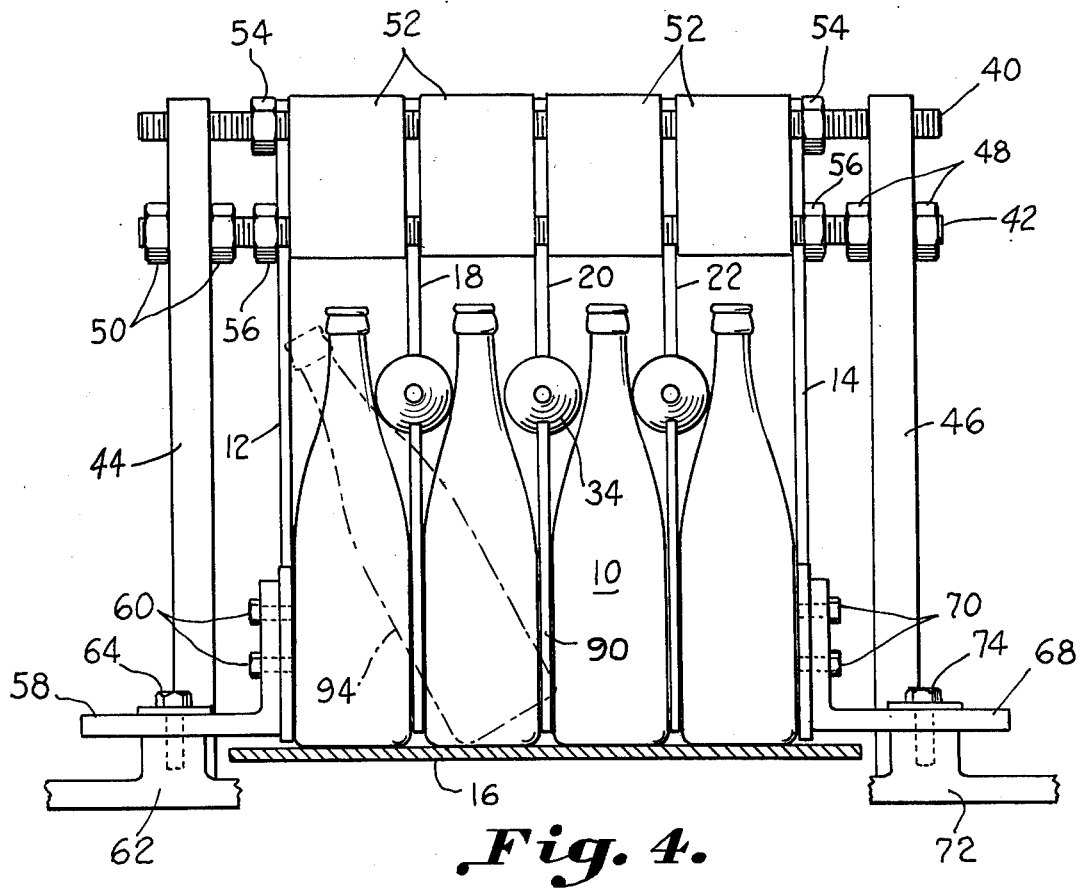
FIG. 4 is a front elevational view of the guide apparatus of FIG. 1.

Referring to FIG. 3, the intermediate guide rail 18 has a vertically inclined slot 84 which extends parallel to the inclined edge 24 of the intermediate guide rail as do each of the other intermediate guide rails 20 and 22. A set screw 86 is received in a countersunk hole 87 formed in one half of the longitudinal body portion 80, and extends through the slot 84. The set screw is threadably received in the opposite half of body portion 80 for securing the wedging device to the intermediate guide rail. The height of the wedging device 34 above the surface of the conveyor 16 may be varied so as to permit use of the wedging device with different size bottles by loosening the setscrew and sliding the wedging device to the desired height position on the intermediate guide rail with the setscrew 86 sliding in the slot 84. With the wedging device positioned at the desired height, the setscrew 86 may then be tightened securing the wedging device to the intermediate guide rail. A wedging portion 88 is integral with the elongated body portion 80 and is tapered away from the body toward the flow of bottles so as to separate the co-mingled mass of bottles into parallel aligned rows on either side of the intermediate guide rail. In a preferred embodiment the wedging portion 88 is formed as a cone section which is made as one piece with the elongated body portion 80. The cone shape of the wedging portion affords a particular advantage when the guide apparatus is used with bottles as providing a smooth surface for engaging a neck portion of the bottles and separating them into rows as is best seen in FIG. 4. Since the bottles approach the wedging devices rather rapidly, it is necessary to have a smooth wedging action between the bottle necks so as to not jar or hit the bottles abruptly causing them to tilt over and jam against the end of the guide rail or fall backwards thus jamming the entrance to the guide apparatus.

The wedging device 34 is provided with an inclined leg member 90 depending therefrom and secured to the wedging device by means of a setscrew 92 threadably received in the elongated body portion 80 of the wedging device. The inclined leg member may be either attached to the wedging device rigidly or may be attached thereto so as to pivot in the direction of the flow of bottles. The inclined leading edge 91 of the depending leg member 90 engages the body portion of a tilted back bottle 94 to position a tilted bottle to an upright position to be conveyed in a parallel row. The wedging device 34 is preferably machined or otherwise formed from a onepiece stock of nylon material.

The intermediate guide rails 18, 20, and 22, as well as the outside guide rails 12 and 14 are formed from steel plates which are coated with teflon. The edges of the guide rails, and particularly the leading edges 24, 26 and 28 of the intermediate guide rails are rounded into smooth surfaces to alleviate the possibility of bottle and label damage. The upper or top portions of the guide rails which are carried by the threaded rods 40 and 42 may have suitable holes or slots formed therein for receiving the threaded rod members therethrough. The assembly described above for carrying the guide rails above the conveyor 16 may be utilized at different locations along the length of the guide rails to support the guide rails as is necessary. Intermediate guide rail 20, interposed between the intermediate guide rails 18 and 22, extends longitudinally beyond the leading edges of intermediate guide rails 18 and 22 for initially separating the co-mingled mass of bottles into a pair of channels on either side of the intermediate guide rail 20. Thereafter, the bottles become aligned in parallel rows by further separation downstream by intermediate guide rails 18 and 22 and the wedging device 34 carried thereon. The number of intermediate guide rails used depends on the number of parallel rows of bottles that is desired. The illustrated embodiment uses three intermediate guide rails since conventional bottle handling machines utilize four rows of bottles.

Figure 2:
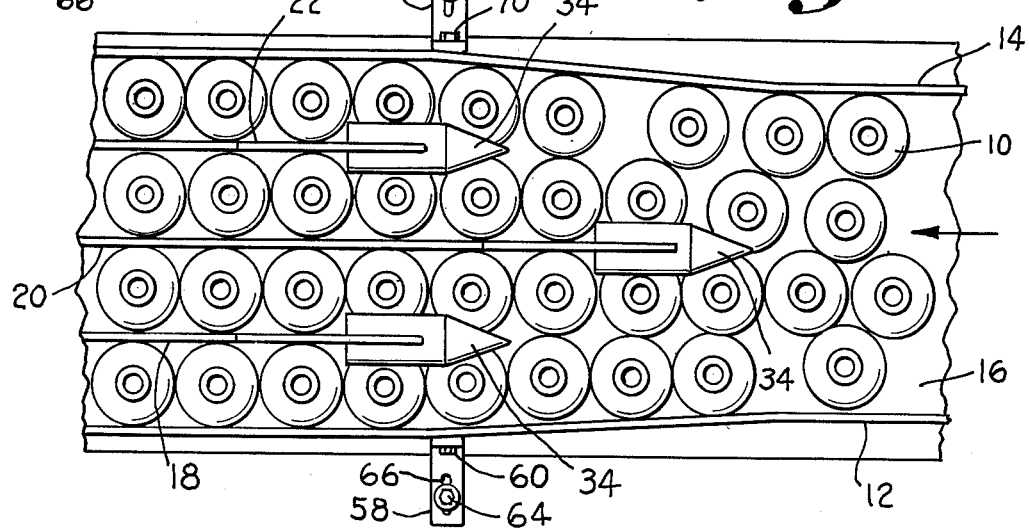
FIG. 2 is a top plan view of the guide apparatus of FIG. 1 illustrating the guide apparatus constructed in accordance with the present invention separating the bottles from a co-mingled mass into parallel rows while being moved by a conveyor.

In operation, on a bottle handling machine, the bottles are conveyed in a co-mingled mass to the entrance of the guide apparatus as is best seen in FIG. 2. The intermediate guide rail 20 which extends beyond the intermediate guide rails 18 and 22 and the wedging device 34 carried thereon separate the bottles from a co-mingled mass into a pair of channels to be conveyed to the intermediate guide rails 18 and 22 downstream thereof. Upon engaging the intermediate guide rails 18 and 22 and the wedging device 34 carried thereon, each channel is further separated into a pair of parallel aligned rows of bottles to be conveyed in rows to the subsequent processing station. During this process, the upright bottles will be separated automatically by the cone portion 88 of each wedging device 34 into the resulting rows. In the event a bottle such as 94 approaches the guide apparatus in a tilted position such that the bottle is below the level of the wedging device, the body portion of the bottle will be engaged by the inclined leg member 90 to position the tilted bottle to an upright position to be conveyed in a parallel row.

Thus, it can be seen that an efficient and expedient guide apparatus is provided for article handling machines such as handling bottles wherein the bottles are separated from a co-mingled mass into parallel aligned rows on a conveyor without interrupting the conveying process by alleviating the possibility of bottles jamming and falling over at the entrance to the guide apparatus.

While a preferred embodiment of the invention has been described using specific terms, such description is for illustrative purposes only, and it is to be understood that changes and variations may be made without departing from the spirit or scope of the following claims.

What is claimed is:

1. For use in bottle handling machines and the like wherein bottles are conveyed on a conveyor in a co-mingled mass to a guide apparatus for aligning the bottles in parallel rows to be conveyed in rows, said guide apparatus comprising:
   a pair of outside guide rails carried above said conveyor upon which the bottles travel,
   at least one intermemdiate guide rail carried above a longitudinal portion of said conveyor,
   an inclined leading edge carried by said intermediate guide rail being inclined downwardly in the direction of conveyance from adjacent the top edge to the bottom edge of said guide rail for engaging a body portion of said bottle when in a tilted position,
   a wedging device carried by said intermediate guide rail for separating the bottles into parallel aligned rows between said guide rails, and said inclined leading edge positioning any tilted bottles to an upright position while being moved by said conveyor.

2. The apparatus of claim 1 wherein said wedging device includes an elongated body portion terminating in an extended cone portion carried by said guide rail providing a wedge for separating the bottles into aligned rows.

3. The apparatus of claim 2 wherein a diametrical slot extends through said elongated body portion of said wedging device for slideably receiving said intermediate guide rail therethrough to position and carry said wedging device thereon.

4. The apparatus of claim 3 further including a vertically inclined slot formed in said intermediate guide rail providing adjustable height positioning of said wedging means carried thereon, means extending through said elongated body portion and said inclined slot for fastening said wedging means in a desired height position.

5. A wedging device for separating bottles on bottle handling machines and the like wherein bottles are conveyed in a co-mingled mass on a conveyor to guide means having a pair of outside guide rails and at least one intermediate guide rail therebetween carried above said conveyor upon which the bottles travel providing a plurality of bottle conveying paths, comprising:
   an elongated body portion carried by said intermediate guide rail,
   attachment means for attaching said elongated body portion to said intermediate guide rail and providing adjustable height positioning of said elongated body portion carried by said intermediate guide rail above said conveyor,
   a wedging portion integral with said elongated body portion tapered away from said body portion towards the flow of said bottles, an inclined leading edge carried by said intermediate guide rail inclined downwardly in the direction of conveyance from adjacent the top to the bottom of said guide rail, said wedging portion extending outwardly from said inclined leading edge for separating the co-mingled mass of bottles into parallel aligned rows on either side of said intermediate guide rail.

6. The device of claim 5 wherein said inclined leading edge is provided by an inclined leg member depending from said wedging device for engaging a body portion of a bottle in a tilted position to position the bottle upright to be conveyed in a row.

7. The device of claim 5 wherein said wedging portion comprises a cone section.

8. The device of claim 6 wherein said leg member pivotably depends from said wedging device.

* * * * *